(12) United States Patent
Lee et al.

(10) Patent No.: US 7,773,563 B2
(45) Date of Patent: Aug. 10, 2010

(54) APPARATUS AND METHOD FOR DECIDING ON VERTICAL HANDOFF

(75) Inventors: Sung-Jin Lee, Seoul (KR); Jung-Je Son, Seongnam-si (KR); Pan-Yuh Joo, Seoul (KR); Jun-Young Jung, Yongin-si (KR); Chong-Kwon Kim, Seoul (KR); Jae-Hyuk Choi, Seoul (KR)

(73) Assignees: Samsung Electronics Co., Ltd (KR); Seoul National University Industry Foundation (KR)

(*) Notice: Subject to any disclaimer, the term of this patent is extended or adjusted under 35 U.S.C. 154(b) by 1086 days.

(21) Appl. No.: 11/451,881

(22) Filed: Jun. 12, 2006

(65) Prior Publication Data

US 2007/0008929 A1     Jan. 11, 2007

(30) Foreign Application Priority Data

Jun. 10, 2005    (KR)   ...................... 10-2005-0049692

(51) Int. Cl.
*H04W 4/00*     (2009.01)

(52) U.S. Cl. ...................... 370/331; 370/332; 370/338; 455/436; 455/437; 455/438; 455/439; 455/440; 455/441; 455/442

(58) Field of Classification Search ................. 455/436, 455/437, 438, 439, 440, 441, 442; 370/331, 370/332, 338
See application file for complete search history.

(56) References Cited

U.S. PATENT DOCUMENTS

| | | | |
|---|---|---|---|
| 2002/0141353 A1* | 10/2002 | Ludwig et al. | ............... 370/254 |
| 2005/0083840 A1 | 4/2005 | Wilson | |
| 2005/0176440 A1* | 8/2005 | Sang et al. | ................... 455/453 |
| 2006/0056448 A1* | 3/2006 | Zaki et al. | ................... 370/466 |
| 2006/0223442 A1* | 10/2006 | Stephens | ................. 455/67.11 |

FOREIGN PATENT DOCUMENTS

| | | |
|---|---|---|
| JP | 08-154265 | 6/1996 |
| KR | 1020000022799 | 4/2000 |
| KR | 1020050030137 | 3/2005 |

* cited by examiner

*Primary Examiner*—Dwayne Bost
*Assistant Examiner*—Pierre-Louis Desir
(74) *Attorney, Agent, or Firm*—The Farrell Law Firm, LLP (57) ABSTRACT

An apparatus and method for determining a vertical handoff for a node supporting a WLAN and an IEEE 802.16 communication system are provided. Reception of a handoff request message from the node is monitored, an expected change in the total throughput of the WLAN in the case where the node is connected to the WLAN is calculated and compared with zero, and if the throughput change is equal to or greater than zero, the handoff request of the node is acknowledged and the node is handed off to the WLAN.

9 Claims, 11 Drawing Sheets

(PRIOR ART)

FIG.3

(PRIOR ART)

APPARATUS AND METHOD FOR DECIDING ON VERTICAL HANDOFF

PRIORITY

This application claims priority under 35 U.S.C. §119 to an application entitled "Apparatus And Method For Deciding On Vertical Handoff" filed in the Korean Intellectual Property Office on Jun. 10, 2005 and assigned Serial No. 2005-49692, the contents of which are incorporated herein by reference.

BACKGROUND OF THE INVENTION

1. Field of the Invention

The present invention relates generally to handoff between heterogeneous networks, called vertical handoff, and in particular, to an apparatus and method for determining a target network for vertical handoff, taking into account the load of each communication system in order to overcome resource imbalance between heterogeneous networks such as a Wireless Local Area Network (WLAN) and an Institute of Electrical and Electronics Engineers (IEEE) 802.16 broadband wireless communication network.

2. Description of the Related Art

With the recent advent of the wireless multimedia era, demands for transmitting a large amount of data on radio channels at high data rates have been increasing drastically. Accordingly, a wireless high-speed data transmission system to support Internet service on mobile channels and radio channels is being developed.

The existing $3^{rd}$ Generation (3G) communication systems support data rates up to 2 Mbps in a fixed or stationary environment, and $4^{th}$ Generation (4G) communication systems are intended to provide services with a variety of Quality of Service (QoS) levels to users, aiming at about 100 Mbps. In this context, efforts are being made to develop a WLAN (Wireless Local-Area Network) that can ensure high data rates (ranging from 20 to 50 Mbps) and a new communication system which can offer a guarantee of mobility and QoS for high-speed data service to be provided by 4G communication systems.

In 1999, a WLAN standard (WLAN) was developed in compliance with IEEE 802.11 for short-range communications among stationary users in a limited area such as indoors, densely populated areas, libraries, etc. in an effort to expand the conventional wired LAN. According to technical standards, the WLAN standard provide Internet connectivity at a high rates from between about 11 and 54 Mbps in "hot spot" areas.

WLANs offer benefits of the low cost and easy deployment of Access Points (APs) which are required for installing the hot spots.

However, since WLANs typically have a radius of about 100 m, a large number of APs are needed to cover a broad area. Moreover, handoff between WLANs (i.e., horizontal handoff) is not supported and service provisioning is difficult during roaming within a hot spot.

On the other hand, the IEEE 802.16 system enables seamless, high-speed wireless Internet access through a portable Internet terminal irrespective of time and place in a stationary state or during walking or movement at an intermediate speed (up to 60 km/h). Particularly the IEEE 802.16 system supports data rates of 1 Mbps or higher at which a variety of ultra fast wireless multimedia services can actively be provided, and supports diverse multimedia terminals such as a laptop computer, a Personal Digital Assistant (PDA), and a smart phone, as well.

The IEEE 802.16 system has a cell radius of about 10 km and nationwide service is possible through proper network configurations. Moreover, the IEEE 802.16 system supports handoff and thus provides a seamless service even during fast movement. However, it also has the distinctive shortcoming that there are limitations in satisfying user demands for servicing a large volume of multimedia contents due to low rates of hundreds of kilo bits per second relative to the data rates of the WLAN. Hence, the IEEE 802.16 system is assumed to be a wireless Internet technology suitable for providing a service like the Internet service to users moving at intermediate/low speeds.

As described above, the WLAN and the IEEE 802.16 system have opposite characteristics. Hence, in order to increase system efficiency, there is a desire to provide vertical handoffs between the WLAN and the IEEE 802.16 system according to the circumstances of a user. While handoff generically refers to handoffs between homogeneous networks, i.e., horizontal handoffs, vertical handoffs will also be supported in 4G.

Figure 1:
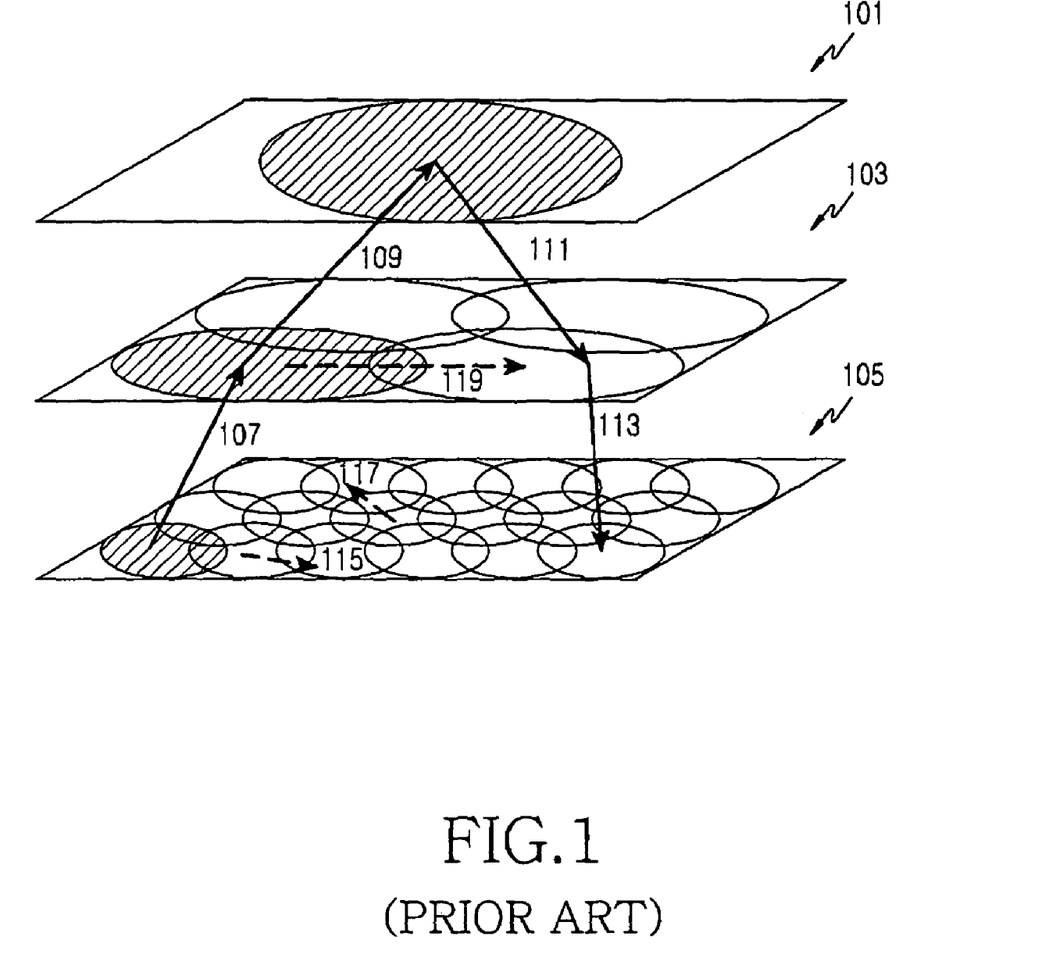
FIG. 1 is a block diagram illustrating typical horizontal and vertical handoffs.

FIG. 1 is a block diagram illustrating typical horizontal and vertical handoffs.

Referring to FIG. 1, Layers 101, 103, and 105 each depict a homogeneous network. Horizontal handoffs 115 and 117 and 119 are illustrated within homogeneous networks 103s and 105, respectively. Vertical handoffs are depicted between heterogeneous networks in steps 107, 109, 111 and 113.

The horizontal handoff occurs between homogeneous networks, i.e., in the same network service area. On the other hand, the vertical handoff is implemented from a small service area to a large service area (e.g., see, steps 107 and 109), or vice versa (e.g., see, steps 111 and 113).

Compared to the horizontal handoff, the vertical handoff between different heterogeneous networks (e.g., the WLAN and IEEE 802.16 systems) should be implemented according to a user situation, taking into account the characteristics of the networks involved. For example, if a user is located within both the service areas of the WLAN and the IEEE 802.16 system and attempts to associate only with the WLAN, seeking high data rate, load imbalance can follow. As more and more users concentrate on the WLAN, the WLAN has deteriorated throughput relative to the IEEE 802.16 system, and thus the IEEE 802.16 system wastes resources.

The WLAN defines two Medium Access Control (MAC) protocols to efficiently share limited IEEE 802.11-compliant radio channels among nodes (stations or terminals): Point Coordination Function (PCF) and Distributed Coordination Function (DCF).

Figure 2:
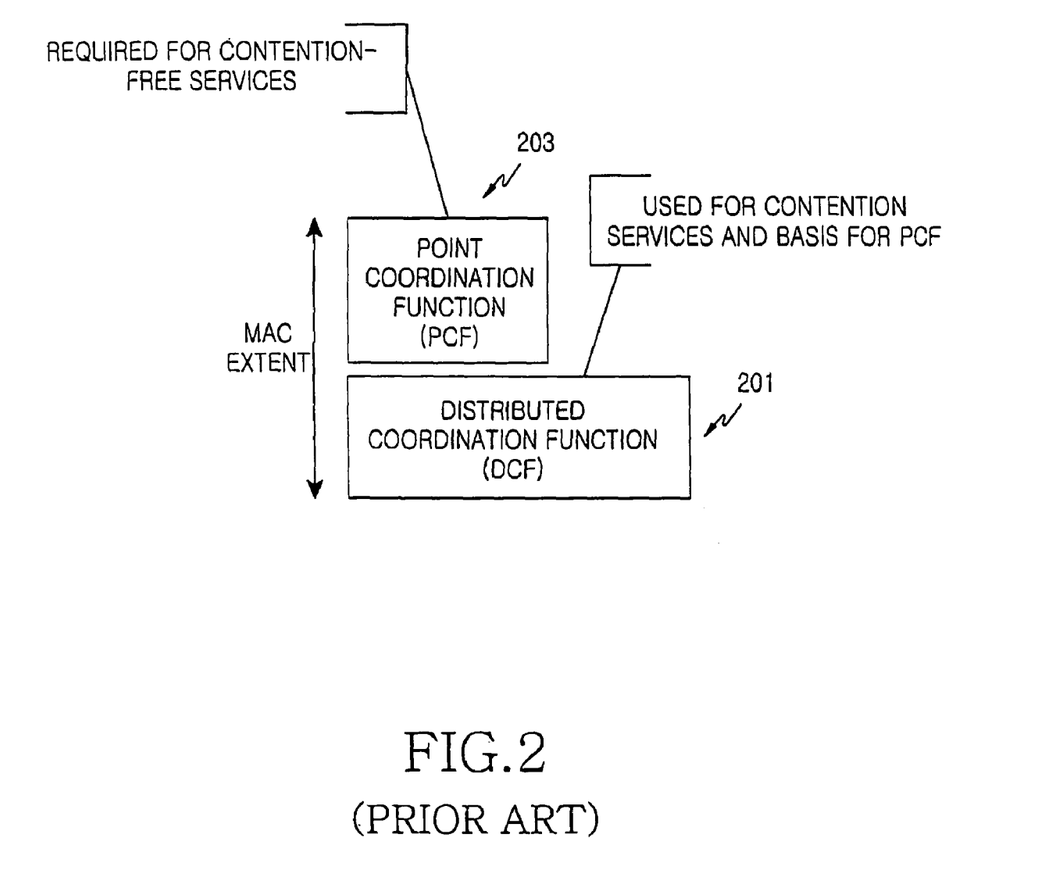
FIG. 2 is a block diagram illustrating a MAC protocol for efficiently controlling a plurality of nodes in a typical WLAN.

FIG. 2 is a diagram illustrating a MAC protocol for efficiently controlling a plurality of nodes in a typical WLAN.

Referring to FIG. 2, a PCF (Point Coordination Function) 203 runs based on a DCF (Distributed Coordination Function) 201. The DCF 201 is a Carrier-Sense Multiple Access/Collision Avoidance (CSMA/CA)-based protocol. The DCF 201 enables nodes to form a network through distributed contention, rather than controlling channel access by an infrastructure such as APs. The PCF 203 controls channel access by particular stations such as APs on the basis of the DCF 201.

In other words, the DCF 201 supports best-effort services, whereas the PCF 203 implements time-bound services using a threshold to guarantee QoS. Yet, complexity and other obstacles hinder commercial use of the PCF 203 and only the DCF 201 is commercialized in the form of a WLAN card. Therefore, the following description is made in the context of the IEEE 802.11 DCF protocol.

Figure 3:
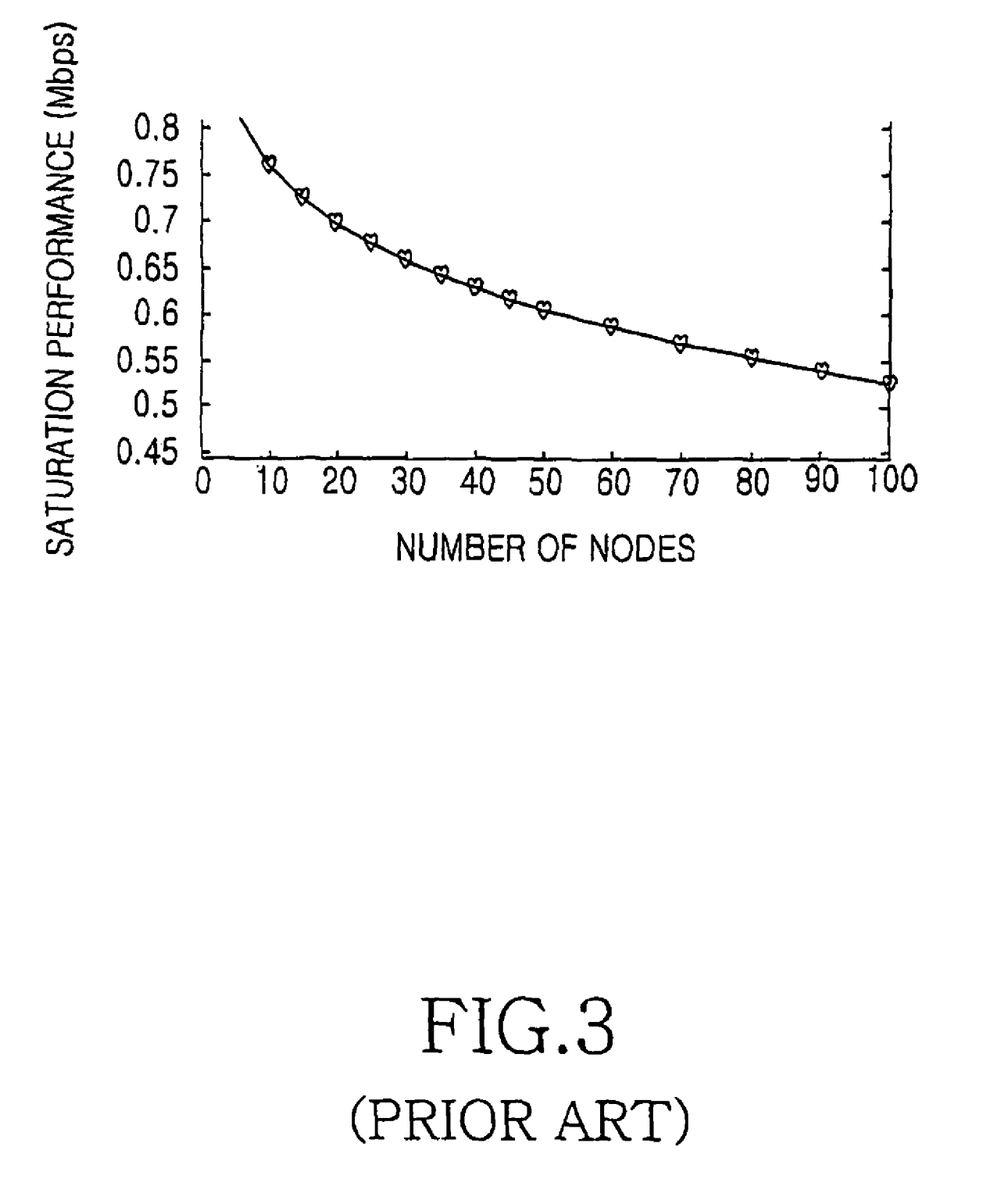
FIG. 3 is a graph illustrating changes in throughput with respect to the number of nodes in the typical WLAN.

Due to its simplicity and flexibility, the IEEE 802.11 DCF protocol finds wide use in WLAN cards. However, since the DCF runs based on CSMA/CA in a distributed fashion for each node, in case where a large number of nodes are connected to one AP, the packet collision probability between the nodes increases. As a consequence, the throughput of the WLAN decreases, as noted from a graph illustrating changes in throughput with respect of the number of nodes in the WLAN in FIG. 3.

Further regarding the IEEE 802.11 protocol in relation to the WLAN throughput, is support of multiple rates in the physical layer. This implies that each node varies its data rate according to channel condition rather than being fixed at a particular data rate.

Table 1 lists modulation schemes used in a WLAN compliant with IEEE 802.11a/h standards.

TABLE 1

| Mode | Modulation | Code Rate | Data Rate | BpS |
|------|-----------|-----------|-----------|-----|
| 1 | BPSK | 1/2 | 6 Mbps | 3 |
| 2 | BPSK | 3/4 | 9 Mbps | 4.5 |
| 3 | QPSK | 1/2 | 12 Mbps | 6 |
| 4 | QPSK | 3/4 | 18 Mbps | 9 |
| 5 | 16-QAM | 1/2 | 24 Mbps | 12 |
| 6 | 16-QAM | 3/4 | 36 Mbps | 18 |
| 7 | 64-QAM | 2/3 | 48 Mbps | 24 |
| 8 | 64-QAM | 3/4 | 54 Mbps | 27 |

Referring to Table 1, available data rates range from 6 Mbps to 54 Mbps through different modulation schemes and code are available in the WLAN.

The reason for using different data rates by different modulation schemes is a variable channel condition arising from the distance between an AP and a node or interference from neighbor nodes. For a node at a good channel condition, a higher-order modulation is used, such as 64-QAM (Quadrature Amplitude Modulation) or 16-QAM in view of a low Bit Error Rate (BER). On the other hand, the use of 64-QAM or 16-QAM increases the BER too much, leading to transmission failure, for a node having a bad channel condition. Therefore, a modulation scheme robust against noise and interference, such as BPSK (Binary Phase Shift Keying) or QPSK (Quadrature Phase Shift Keying) is used, which leads to low data rate.

As described above, because each node uses a different modulation scheme according to its channel condition, the co-existence of nodes with different data rates in the WLAN results in performance anomaly.

Figure 4A:
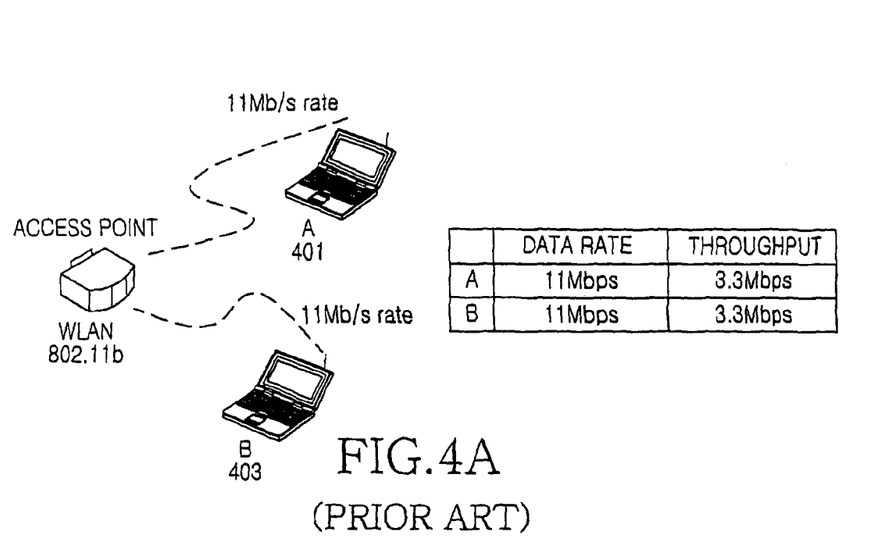
FIGS. 4A and 4B are block diagrams illustrating a performance anomaly encountered with the typical WLAN.
Figure 4B:
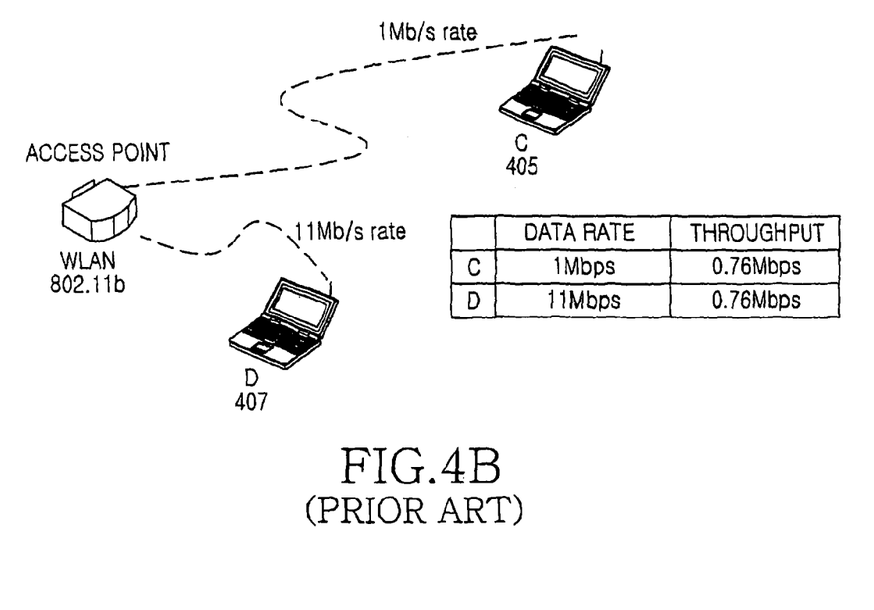

FIGS. 4A and 4B are block diagrams illustrating a performance anomaly encountered with the typical WLAN. It is assumed herein that only two nodes exist in the IEEE 802.11b-compliant WLAN.

In the illustrated case of FIG. 4A, two nodes 401 and 403 (i.e., node A and node B, respectively) operate at 11 Mbp. Assuming that node A and node B alternately send data based on contention according to the DCF protocol, the total throughput of the WLAN is 3.3 Mbps per node, considering protocol overhead.

In the illustrated case of FIG. 4B, two nodes 405 and 407 (i.e., node C and node D, respectively) operate at 1 Mbp and 11 Mbps, respectively. Assuming that node C and node D alternately send data based on contention according to the DCF protocol, the total throughput of the WLAN is about 0.76 Mbps per node, considering protocol overhead.

This dropped throughput phenomenon caused by the participation of a low-rate node with high-rate nodes, is called performance anomaly.

Meanwhile, IEEE 802.16 services are classified into real-time service having a QoS requirement intolerant to transmission delay such as video streaming, audio streaming, interactive gaming, etc., and delay-tolerant non-real-time service such as file transfer, multimedia mail, chatting, and electronic trade, and best-effort service tolerant to transmission delay and having no guarantee of resources during a service, such as web browsing and e-mail.

Table 2 below lists significant schemes and requirements for wireless connection of 2.3 GHz portable Internet.

TABLE 2

| Item | Scheme or Value |
|------|-----------------|
| Multiplexing | TDD (Time Division Duplex) |
| Multiple Access | OFDMA (Orthogonal Frequency Division Multiple Access) |
| Channel Bandwidth | 10 MHz |
| Data Rate per Subscriber | Uplink minimum/maximum rate: 128 Kbps/1 Mbps<br>Downlink minimum/maximum rate: 512 Kbps/3 Mbps |
| Frequency Reuse Factor | 1 |
| Frequency Efficiency | Maximum frequency efficiency: downlink/uplink (6/1)<br>Average frequency efficiency: downlink/uplink (2/1) |
| Handoff | Inter-cell handoff in BS, inter-BS handoff, inter-frequency handoff: 150 ms or below |
| Mobility | Maximum 60 Km/h |
| Service Coverage | Picocell: 100 m<br>Microcell: 400 m<br>Macrocell: 1 Km |

Table 2 illustrates that the IEEE 802.16 system can allocate resources to nodes in TDD-OFDMA. Therefore, the performance anomaly causing a throughput decrease as encountered with the WLAN does not exist. Consequently, when the number of users increase, the IEEE 802.16 system divides/allocates resources according to the number of the users without decreasing the total throughput.

The WLAN and the IEEE 802.16 system show different throughput changes with respect to the increase in the number of users. Especially, the WLAN may suffer a rapid throughput decrease due to performance anomaly when a low-rate node is added. If vertical handoff is implemented between the WLAN and the IEEE 802.16 system with no regard to the characteristics of both networks in relation to the increase of the number of users, the nodes are highly inclined to move to the WLAN. The resulting decrease in the WLAN throughput causes resources dissipation in the IEEE 802.16 system.

Accordingly, there exists a need for developing a method of increasing the overall efficiency of resources without causing load imbalance between systems.

SUMMARY OF THE INVENTION

An object of the present invention is to substantially solve at least the above problems and/or disadvantages and to provide at least the advantages below. Accordingly, an object of the present invention is to provide an apparatus and method for deciding on handoff between heterogeneous networks.

Another object of the present invention is to provide an apparatus and method for deciding on handoff between heterogeneous networks, taking into account the load of an entire system.

A further object of the present invention is to provide an apparatus and method for deciding on handoff between heterogeneous networks, taking into account the total throughput of a WLAN.

The above objects are achieved by providing an apparatus and method for determining a vertical handoff for a node supporting a WLAN and an IEEE 802.16 communication systems.

According to one aspect of the present invention, in an apparatus for determining a vertical handoff, taking into account system load in a WLAN, a link layer of a data link layer temporarily stores packets for nodes in communication to be provided to a MAC layer, a physical layer provides information about a data rate of a node requesting a handoff to the MAC layer, the MAC layer of the data link layer determines whether to acknowledge the handoff request of the node based on the packets received from the data link layer and the data rate information received from the physical layer.

According to another aspect of the present invention, in a method of determining a vertical handoff, taking into account system load, when a node discovers at least two networks simultaneously, the total throughputs of the at least two networks before the node is connected to the at least two networks is calculated, changed total throughput of the at least two networks is calculated by estimating throughput changes in the cases where the node is connected to the at least two networks, respectively, then the changed total throughput is compared, and a network having the higher of the changed total throughput is selected, and the node is handed off to the selected network.

According to a further aspect of the present invention, in a method of determining a vertical handoff for a node supporting a WLAN and an IEEE 802.16 systems in the WLAN, reception of a handoff request message from the node is monitored, an expected change in the total throughput of the WLAN in the case where the node is connected to the WLAN is calculated and compared with zero, and if the throughput change is equal to or greater than zero, the handoff request of the node is acknowledged and the node is handed off to the WLAN.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

The present invention provides a technique for deciding on vertical handoff, taking into account system load in a heterogeneous network environment. The following description will be made in the context of a WLAN and an IEEE 802.16 system. It is assumed that each node is equipped with multi-network adapters by which to access the WLAN and the IEEE 802.16 system.

Figure 5A:
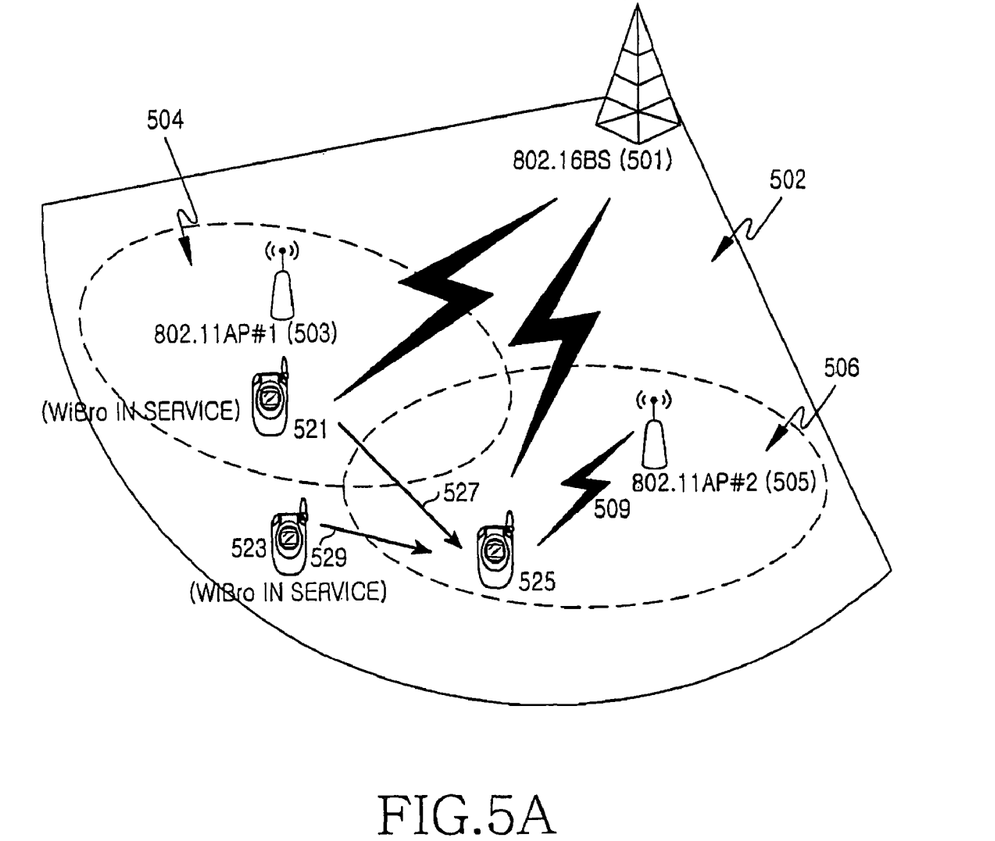
FIG. 5A is a block diagram illustrating a situation triggering a vertical handoff according to the present invention.
Figure 5B:
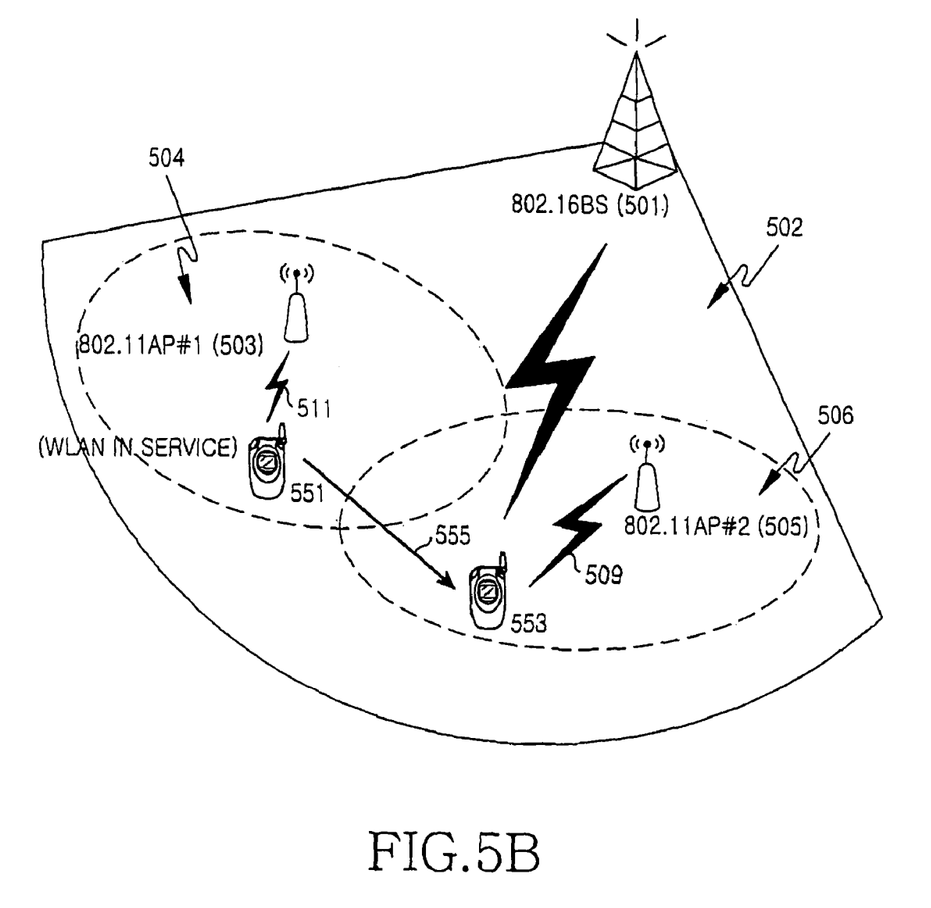
FIG. 5B is a block diagram illustrating a situation triggering a vertical handoff according to the present invention.

When a node discovers two networks (e.g. WLAN and IEEE 802.16) simultaneously, as illustrated in FIGS. 5A and 5B, a target network for handoff is determined considering system load according to the present invention.

FIG. 5A is a block diagram illustrating a situation triggering a vertical handoff according to the present invention.

Referring to FIG. 5A, the cell coverage 502 of an IEEE 802.16 Base Station (BS) 501 overlaps with the cell coverage 504 of a first WLAN AP 503 (AP #1) or the cell coverage 506 of a second WLAN AP 505 (AP #2). A node (e.g., a terminal or a station) 521, which is located in the cell coverage 504 of AP #1 and serviced by the IEEE 802.16 system, moves to the cell coverage 506 of AP #2, as indicated by reference numeral 527. The node 521 then has to decide on whether to continue to receive a service from the IEEE 802.16 BS 501, or to receive a WLAN signal 509 by vertical handoff to the cell coverage 506 of AP #2.

If a node 523 connected to the IEEE 802.16 system within the cell coverage 502 of the IEEE 802.16 BS 501 moves to an area 525 overlapped between the coverage areas 502 and 506, as indicated by reference numeral 529, the node 523 has to decide whether to continue to receive a service from the IEEE 802.16 BS 501 or to receive the WLAN signal 509 by vertical handoff to the cell coverage 506 of AP #2.

FIG. 5B is a block diagram illustrating a situation triggering a vertical handoff according to the present invention.

Referring to FIG. 5B, the cell coverage 502 of the IEEE 802.16 BS 501 overlaps with the cell coverage 504 of AP #1 or the cell coverage 506 of AP #2. A node 551, currently using the WLAN, moves to an area 553 overlapped between the coverage areas 502 and 506, as indicated by reference numeral 555. The node 551 has to make a decision as to whether to receive an IEEE 802.16 signal 507 by vertical handoff to the cell coverage 502 of the IEEE 802.16 BS 501 or to receive the WLAN signal 509 by horizontal handoff to the cell coverage 506 of AP #2.

When the node discovers two networks simultaneously and has to select one of them, it is desirable to select an appropriate network according to the situation of the node. Therefore, the present invention provides a handoff determining method for maintaining load balance between networks, satisfying a user demand for high data rate.

When the node discovers WLAN and IEEE 802.16 systems at the same time, it calculates expected Total Network Throughput Comparisons (TNTCs) in the case of connecting to the WLAN and in the case of connecting to the IEEE 802.16 system, respectively. The node then selects a system offering the higher total throughput and implements a handoff to the selected system. A TNTC is the sum of the total throughput of the IEEE 802.16 system and the total throughput of the WLAN (TNTC=$S_{WiBro+SWLAN}$).

Figure 6A:
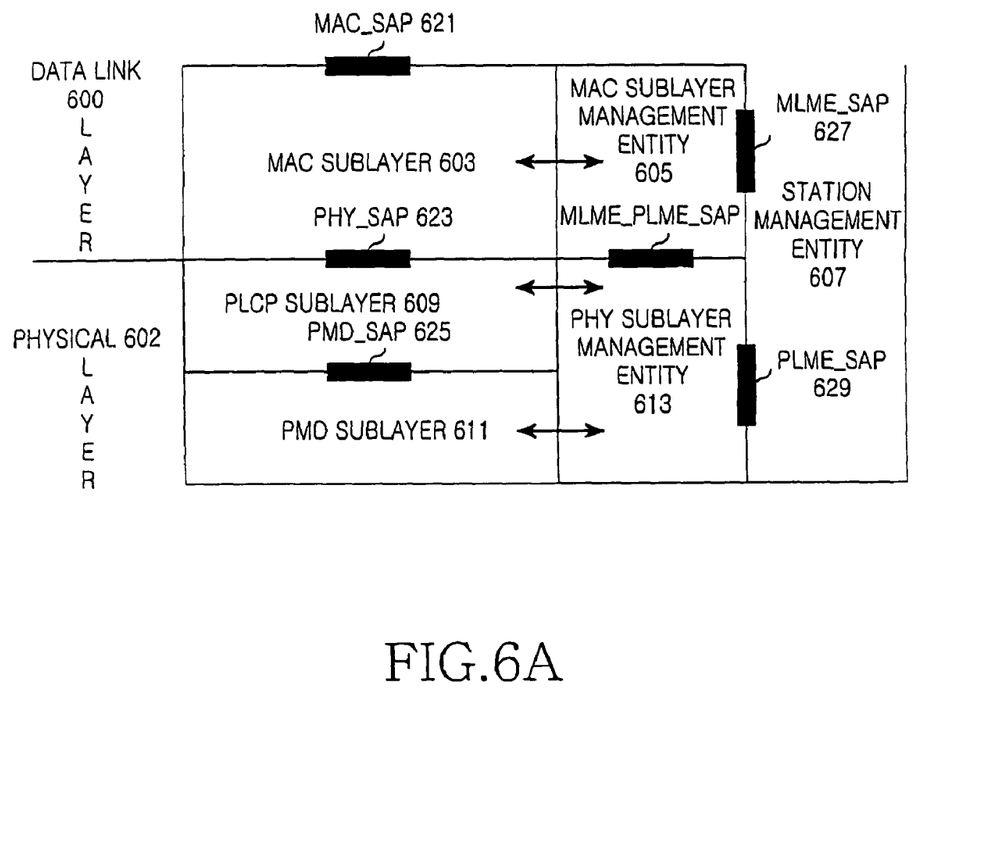
FIGS. 6A and 6B are diagrams illustrating a the hierarchical structure of a wireless network card according to the present invention.
Figure 6B:
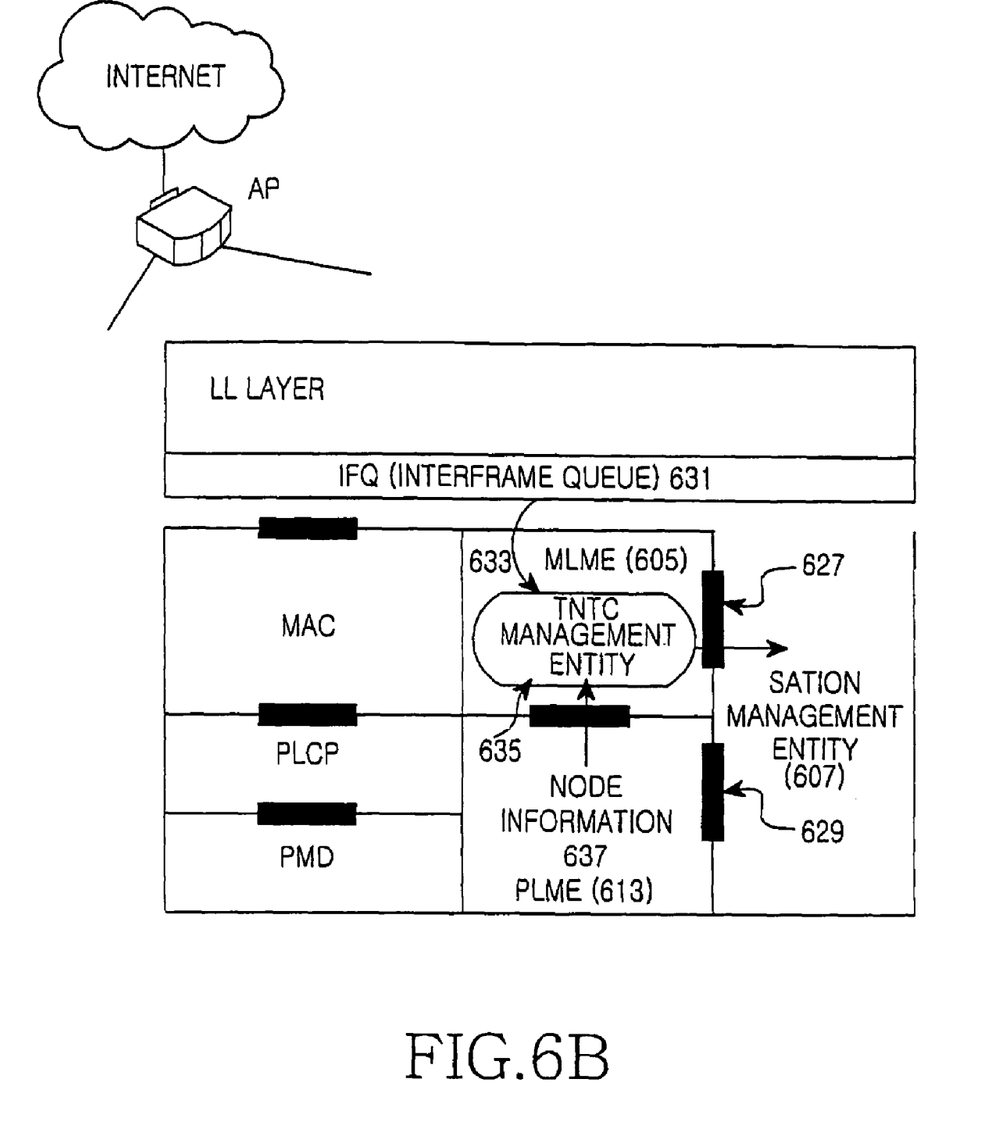

FIG. 6A is a diagram illustrating the hierarchical structure of a wireless network card according to the present invention, and FIG. 6B is a diagram illustrating a hierarchical structure for deciding on a handoff in an AP of the WLAN according to the present invention. The following description is made of a hierarchical structure in the WLAN where an algorithm for deciding on a target network for handoff of a node is used.

Referring to FIG. 6A, the wireless network card is configured to include a data link layer 600 and a physical layer 602.

The data link layer 600 and the physical layer 602 each are divided into smaller entities according to their services. The entities communicate with one another via Service Access Point (SAP) interfaces 621 to 629.

The data link layer 600 is divided into a link layer and a MAC layer and the present invention will focus on the MAC layer.

The MAC layer includes a MAC sublayer 603 and a MAC Sublayer Management Entity (MLME) 605. The MAC sublayer 603 controls an operation for channel access in compliance with the DCF of the WLAN. The MAC sublayer 603 is a basic part for data transmission and reception to and from nodes using radio channels in the WLAN. The MLME 605 is responsible for control and operation of channels and services, such as channel access, handoff processing, beacon message processing, and power control, rather than direct communications.

The physical layer 602 includes a Physical Layer Convergence Procedure (PLCP) sublayer 609, a Physical Medium Dependent (PMD) sublayer 611, and a PHY sublayer management entity 613.

The PLCP sublayer 609 converts a signal from a service generated from the MAC layer 600 to a physical layer signal and vice versa. It also enables the MAC layer 600 to operate independently of the physical layer 602. The PMD sublayer 611 converts the service from the MAC layer 600 to be suitable for processing in the physical layer 602. The PHY sublayer management entity 613 manages the functionalities of the physical layer 602 in conjunction with the MLME 605.

A Station Management Entity (SME) 607 residing across the data link layer 600 and the physical layer 602 sends information associated with control and operation of channels and services, rather than direct communications. That is, it is informed of a decision made by the MLME 605 (e.g. channel access, handoff, beacon message processing, power control) via the MLME-SAP 627 and sends a corresponding control frame.

FIG. 6B is a diagram illustrating a structure for running an algorithm for determining a handoff from the WLAN in the WLAN hierarchical structure illustrated in FIG. 6A according to the present invention.

Referring to FIG. 6B, packets to be transmitted from a WLAN AP are temporarily stored in an InterFrame Queue (IFQ) 631 of the link layer in the data link layer 600 because the MAC layer can only control one packet at one time.

The MLME 605 receives the packets from the IFQ 631 and information about the data rate of a node requesting a handoff from the PLME 613 and performs an algorithm for determining whether the node is to perform the handoff, as indicated by reference numeral 635. After the determination, the MLME 605 sends information about the determination to the SME 607 via the MLME-SAP 627, as indicated by reference numeral 637.

As described above, upon receipt of activated packets for a node from the IFQ 631, a target network for a handoff is determined and then the handoff is performed by the algorithm. This algorithm will be described in more detail.

When a node discovers the WLAN and the IEEE 802.16 networks simultaneously, expected TNTCs in the cases where the node might be connected to the respective networks are calculated by Equation 1 below:

$$TNTC_{WiBro} = S'_{WiBro} + S_{WLAN} \quad TNTC_{WLAN} = S_{WiBro} + S'_{WLAN} \qquad \text{Equation 1}$$

where $TNTC_{WiBro}$ denotes a TNTC and $S'_{WiBro}$ denotes the total throughput of the IEEE 802.16 system when the node is connected to the IEEE 802.16 system. $TNTC_{WLAN}$ denotes a TNTC and $S'_{WLAN}$ denotes the total throughput of the WLAN when the node is connected to the WLAN.

After calculating $TNTC_{WiBro}$ and $TNTC_{WLAN}$, $TNTC_{WiBro}$ and $TNTC_{WLAN}$ are compared with the TNTC, respectively, thereby calculating the variation of the TNTC. The difference between the TNTC and $TNTC_{WiBro}$ is denoted by $\Delta TNTC_{WiBro}$ and the difference between the TNTC and $TNTC_{WLAN}$ is denoted by $\Delta TNTC_{WLAN}$.

The node selects a system offering a higher throughput increment or a smaller throughput decrement and performs handoff to the selected system. That is, if $\Delta TNTC_{WiBro} < \Delta TNTC_{WLAN}$, the node hands off to the WLAN and if $\Delta TNTC_{WiBro} > \Delta TNTC_{WLAN}$, the node hands off to the IEEE 802.16 system.

Because a scheduler controls resource allocation to nodes connected to the IEEE 802.16 system, the total throughput of the IEEE 802.16 system is not decreased despite an increase in the number of connected nodes. That is, as the number of nodes increases, the total throughput of the IEEE 802.16 system increases. When the throughput reaches a maximum level, it is saturated. Hence, $\Delta TNTC_{WiBro}$ can be set to zero.

When $\Delta TNTC_{WiBro} = 0$, only the throughput change of the WLAN is calculated and a system to which the node is to be connected is selected based on the throughput change.

Figure 7:
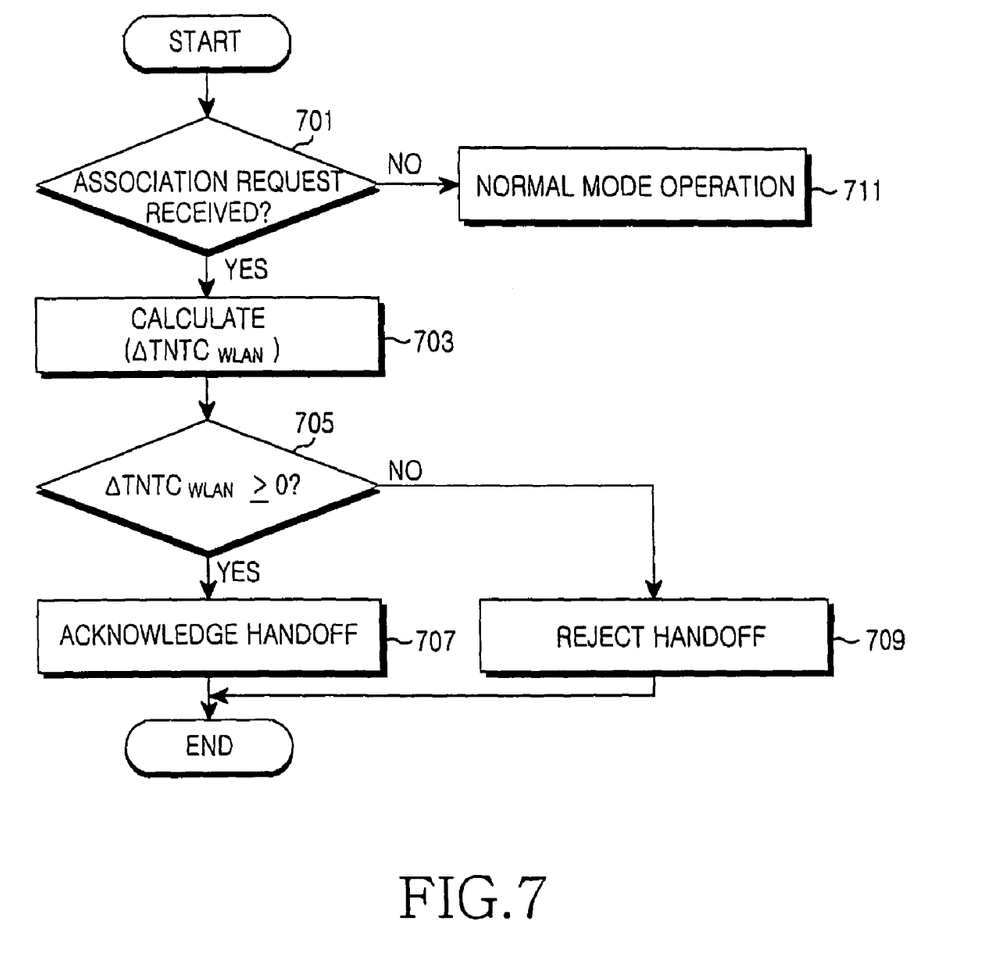
FIG. 7 is a flowchart illustrating a procedure for deciding on handoff for a node in an AP of a WLAN according to the present invention.

FIG. 7 is a flowchart illustrating a procedure for deciding on handoff for a node in an AP of the WLAN according to the present invention. When the node simultaneously discovers both the WLAN and IEEE 802.16 system, the AP selects one of the two systems as follows.

The throughput change of the WLAN can be measured in two ways: (1) by measuring the throughput by nodes in a distributed fashion; and (2) by measuring the throughput by a central manager, i.e., an AP. Unfortunately, in the first case, it takes a long time to sample and reliability is low. Accordingly, the network traffic measuring by an AP is adopted in the present invention.

Referring to FIG. 7, the AP of the WALN monitors reception of an Association Request message from a node which intends to handoff to the WLAN in step 701. In the absence of the Association Request message, the AP performs a normal mode operation (e.g., an idle mode) in step 711.

Upon receipt of the Association Request message, the AP calculates $\Delta TNTC_{WLAN}$ by comparing $S_{WLAN}$ and $S'_{WLAN}$ using Equation 2 in step 703.

$S_{WLAN}$ is calculated by Equation (2):

$$S_{WLAN} = \frac{1}{\sum_{k=1}^{n} \frac{1}{R_k}} \times n \qquad (2)$$

where $S_{WLAN}$ denotes the throughput of the WLAN, n is the number of nodes being activated (i.e. the number of nodes for which an AP queue has at least one packet), and $R_k$ denotes the data rate of each node to the AP. $S'_{WLAN}$ can also be calculated.

In step 705, the AP compares $\Delta TNTC_{WLAN}$ with 0. If $\Delta TNTC_{WLAN}$ is equal to or greater than zero, the AP acknowledges the handoff of the node to the WLAN in step 707.

If $\Delta TNTC_{WLAN}$ is less than zero, the AP rejects the handoff of the node to the WLAN, that is, commands a handoff to the other network (IEEE 802.16) to the node in step 709. Then the AP terminates the algorithm.

The throughput of the WLAN in FIG. 7 is calculated with respect to not every node within the WLAN but with respect to nodes being serviced by the WLAN. This throughput calculation is shown in FIG. 8.

Figure 8:
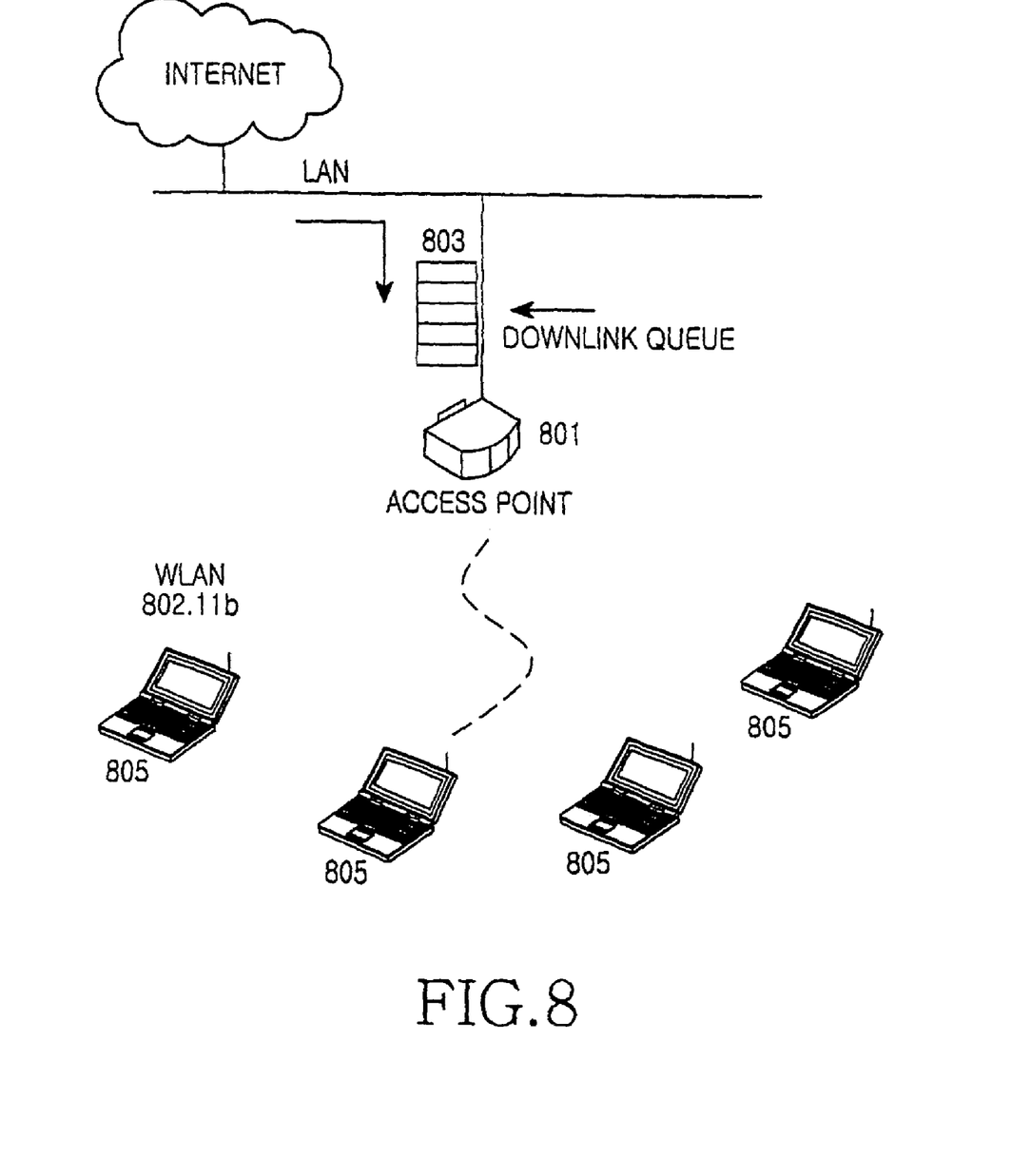
FIG. 8 is a block diagram illustrating a downlink queue in the AP of the WLAN according to the present invention.

FIG. 8 illustrates a downlink queue in the AP of the WLAN according to an embodiment of the present invention.

Figure 9:
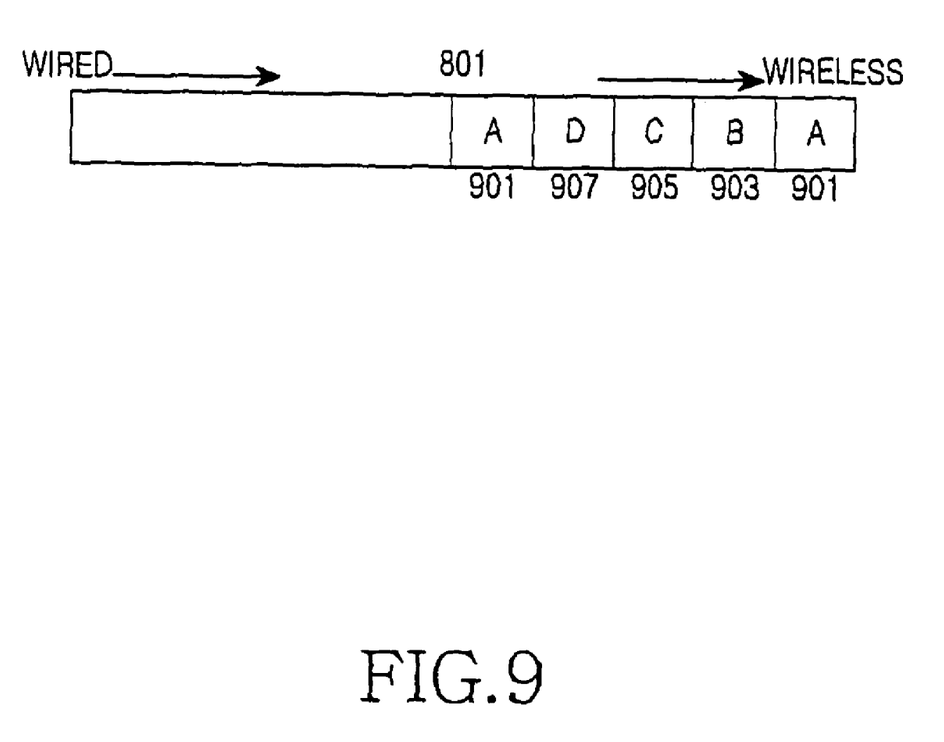
FIG. 9 is a detailed view illustrating the downlink queue illustrated in FIG. 8.

Referring to FIG. 8, in an AP 801 of the WLAN, a downlink queue 803 has packets destined for nodes 805 being serviced by the WLAN. The AP 801 can find out the destinations of the packets and data rates of the nodes by the headers of the packets. The downlink queue 803 is illustrated in detail in FIG. 9. Referring to FIG. 9, four nodes are being activated due to packets 901, 903, 905 and 907 (packets A, B, C and D). Assuming that the data rates of the nodes are 11 Mbps (packet A), 5.5 Mbps (packet B), 2 Mbps (packet C), and 1 Mbps (packet D), the current total throughput of the WLAN, $S_{WLAN}$ is calculated to be 2.256 Mbps by

1/(1/11+1/5.5+1/2+1/1)×4=11/19.5×4=0.56M×4.

If node A having 5.5 Mbps requests handoff, the resulting changed throughput of the WLAN, $S'_{WLAN}$ is calculated to be 2.558 Mbps by

1/(1/11+1/5.5+1/2+1/1+1/5.5)×5=11/21.5×5=0.51M×5.

Since the total throughput of the WLAN increases with the handoff of node A, the WLAN acknowledges a handoff request of node A to the WLAN. Node A receives a beacon message periodically from the AP and measures a data rate by the received beacon message. The beacon message is a management frame notifying the existence of the AP to nodes around the AP and containing information required for operation/management in the WLAN.

If node B with a data rate of 2 Mbps requests handoff, the resulting changed throughput of the WLAN, $S'_{WLAN}$ is calculated to be 2.2 Mbps by

1/(1/11+1/5.5+1/2+1/1+1/2)×5=11/25×5=0.44M×5.

Since the handoff of the node B decreases the total throughput of the WLAN, the WLAN rejects the handoff request of node B and commands node B to handoff to the IEEE 802.16 system.

In accordance with the present invention as described above, in determining a vertical handoff, a change in throughput that might be brought by the vertical handoff of a node is calculated with respect to involved networks, respectively, and a target network for the handoff is selected according to the throughput changes. Therefore, overall load balance is achieved between the networks.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for determining a vertical handoff using system load in a Wireless Local Access Network (WLAN), comprising:

a Medium Access Control (MAC) layer;
a link layer of a data link layer, for temporarily storing packets to be provided to the MAC layer, the packets destined for corresponding communicating nodes; and
a physical layer for providing information about a data rate of a node requesting a handoff to the MAC layer,
wherein the MAC layer calculates a total throughput of the WLAN using data rate information of the nodes corresponding to the packets received from the link layer,
calculates an expected total throughput using the data rate information of the nodes and the data rate information of the node requesting the handoff, when the node performs the handoff,
calculates a change in the total throughput of the WLAN by comparing the total throughput with the expected total throughput, and
determines whether to allow the handoff for the node according to the change in the total throughput.

2. The apparatus of claim 1, wherein the total throughput is calculated by:

$$S_{WLAN} = \frac{1}{\sum_{k=1}^{n} \frac{1}{R_k}} \times n,$$

where $S_{WLAN}$ denotes the throughput of the WLAN, n is the number of nodes being activated, and $R_k$ denotes the data rate of each node to an access point (AP), wherein the number of nodes being activated is determined by the number of nodes for which an AP queue has at least one packet.

3. A method of determining a vertical handoff, taking into account system load, comprising the steps of:

calculating, when a node discovers at least two networks simultaneously, a total throughput of each of the at least two networks before the node is connected to the at least two networks, a first one of the at least two networks being a Wireless Local Access Network (WLAN);
calculating changed total throughputs of the at least two networks by estimating throughput changes considering cases where the node is connected to each of the at least two networks, respectively;
comparing the changed total throughputs;
selecting a network having a higher of the changed total throughputs; and
handing off the node to the selected network,
wherein the total throughput of the WLAN is calculated by:

$$S_{WLAN} = \frac{1}{\sum_{k=1}^{n} \frac{1}{R_k}} \times n,$$

where $S_{WLAN}$ denotes the throughput of the WLAN, n is a number of the nodes bein activated, $R_k$ denotes a data rate of each node to an access point (AP), and the number of the nodes being activated is determined by a number of nodes for which an AP queue has at least one packet.

4. The method of claim 3, wherein the node comprises a multi-network adapter for accessing the at least two networks.

5. The method of claim 3, wherein a second one of the at least two networks include at least one of an IEEE 802.16 system, a Wideband Code Division Multiple Access (WCDMA) system, a Wireless Broadband (WiBro) system, and a CDMA-2000 system.

6. A method of determining a vertical handoff for a node supporting a Wireless Local Access Network (WLAN) and an IEEE 802.16 system included in the WLAN, comprising:
  monitoring reception of a handoff request message from the node;
  calculating an expected change in a total throughput of the WLAN, when the node is connected to the WLAN, by comparing the total throughput of the WLAN before the handoff and an expected total throughput of the WLAN after the handoff;
  comparing the throughput change with zero; and
  acknowledging the handoff request message of the node and handing off the node to the WLAN, if the throughput change is equal to or greater than zero.

7. The method of claim 6, wherein the total throughput of the WLAN is calculated by:

$$S_{WLAN} = \frac{1}{\sum_{k=1}^{n} \frac{1}{R_k}} \times n,$$

where $S_{WLAN}$ denotes the throughput of the WLAN, n is the number of nodes being activated, and $R_k$ denotes the data rate of each node to an access point (AP), wherein the number of nodes being activated is determined by the number of nodes for which an AP queue has at least one packet.

8. The method of claim 6, further comprising the step of:
  rejecting the handoff request of the node, if the throughput change is less than zero.

9. A method of determining a handoff, comprising:
  calculating, when a node discovers at least two networks simultaneously, a total throughput of each of the at least two networks before the node is connected to the at least two networks, a first one of the at least two networks being a Wireless Local Access Network (WLAN);
  calculating changed total throughputs of the at least two networks by estimating throughput changes considering cases where the node is connected to each of the at least two networks, respectively;
  comparing the changed total throughputs;
  selecting a network having a higher of the changed total throughputs; and
  handing off the node to the selected network,
  wherein the total throughput of the WLAN is calculated by:

$$S_{WLAN} = \frac{1}{\sum_{k=1}^{n} \frac{1}{R_k}} \times n,$$

where $S_{WLAN}$ denotes the throughput of the WLAN, n is a number of the nodes being activated, $R_k$ denotes a data rate of each node to an access point (AP), and the number of the nodes being activated is determined by a number of nodes for which an AP queue has at least one packet.

* * * * *